United States Patent
Ono et al.

(10) Patent No.: US 11,305,465 B2
(45) Date of Patent: Apr. 19, 2022

(54) METHOD FOR MANUFACTURING A PHOSPHOR SHEET

(71) Applicants: Tadashi Ono, Tokyo (JP); Makoto Kitazume, Tokyo (JP)

(72) Inventors: Tadashi Ono, Tokyo (JP); Makoto Kitazume, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 170 days.

(21) Appl. No.: 16/282,554

(22) Filed: Feb. 22, 2019

(65) Prior Publication Data
US 2019/0275711 A1 Sep. 12, 2019

(30) Foreign Application Priority Data
Mar. 9, 2018 (JP) .............................. JP2018-042870

(51) Int. Cl.
*B29C 43/00* (2006.01)
*B29B 7/90* (2006.01)
*B29C 43/20* (2006.01)
*B29B 7/00* (2006.01)
*B29L 9/00* (2006.01)
*B29K 507/00* (2006.01)
*B29L 7/00* (2006.01)

(52) U.S. Cl.
CPC ............ *B29C 43/003* (2013.01); *B29B 7/005* (2013.01); *B29B 7/90* (2013.01); *B29C 43/203* (2013.01); *B29K 2507/00* (2013.01); *B29L 2007/002* (2013.01); *B29L 2009/00* (2013.01)

(58) Field of Classification Search
None
See application file for complete search history.

(56) References Cited

U.S. PATENT DOCUMENTS 9,006,006 B2 * 4/2015 Konishi ................. H01L 33/501
438/26
9,882,101 B2 1/2018 Toyoda et al.
(Continued)

FOREIGN PATENT DOCUMENTS

JP 2007-301843 11/2007
JP 2013-033808 2/2013
(Continued)

OTHER PUBLICATIONS

Office Action dated Feb. 15, 2022 with respect to the corresponding Japanese patent application No. 2018-042870.

*Primary Examiner* — Edmund H Lee
(74) *Attorney, Agent, or Firm* — IPUSA, PLLC

(57) ABSTRACT

A method for manufacturing a phosphor sheet is provided. In the method, a particulate phosphor and a particulate transparent medium are mixed to a first light transmissive resin in a liquid state. The first light transmissive resin containing the phosphor and the transparent medium in the liquid state is supplied into a lower mold of a mold, and the mold is closed. The first light transmissive resin containing the phosphor and the transparent medium in the liquid state is changed to a solid state having a predetermined thickness by applying a heat and a pressure to the first light transmissive resin containing the phosphor and the transparent medium in the liquid state.

9 Claims, 4 Drawing Sheets

(56) References Cited

U.S. PATENT DOCUMENTS

| | | | | |
|---|---|---|---|---|
| 2006/0226759 | A1* | 10/2006 | Masuda | H01L 33/504 |
| | | | | 313/486 |
| 2010/0013373 | A1* | 1/2010 | Hata | H05B 33/145 |
| | | | | 313/502 |
| 2010/0188613 | A1* | 7/2010 | Tsukahara | H05B 33/14 |
| | | | | 349/69 |
| 2010/0246160 | A1* | 9/2010 | Ito | G02F 1/133603 |
| | | | | 362/84 |
| 2010/0291313 | A1* | 11/2010 | Ling | H05B 33/10 |
| | | | | 427/475 |
| 2012/0013248 | A1* | 1/2012 | Yoshino | H01J 11/12 |
| | | | | 313/587 |
| 2013/0193837 | A1* | 8/2013 | Ohno | H05B 33/12 |
| | | | | 313/498 |
| 2015/0075611 | A1* | 3/2015 | Inamura | C09K 11/7731 |
| | | | | 136/257 |
| 2018/0076181 | A1* | 3/2018 | Onuma | H01L 25/0753 |
| 2018/0358517 | A1* | 12/2018 | Ryohwa | C09K 11/08 |

FOREIGN PATENT DOCUMENTS

| | | |
|---|---|---|
| JP | 2017-174908 | 9/2017 |
| WO | 2015/041204 | 3/2015 |
| WO | wo2019174705 * | 9/2019 |

* cited by examiner

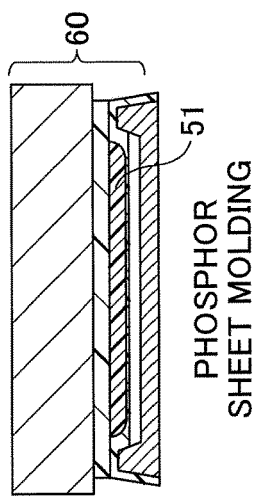
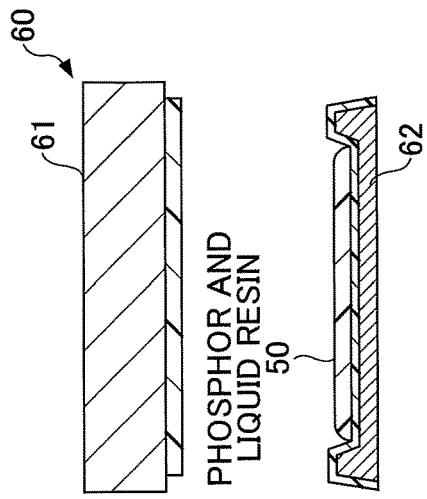
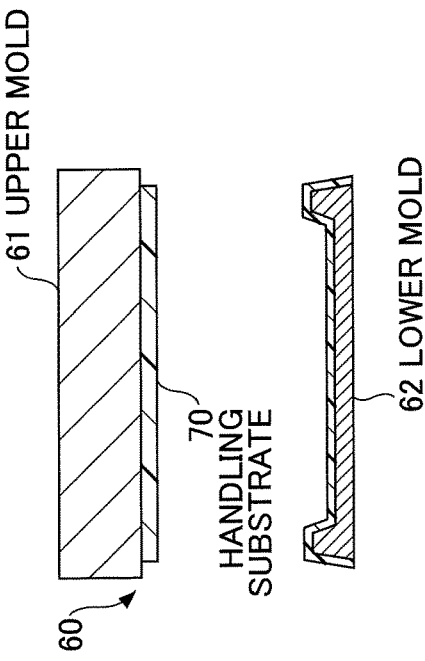
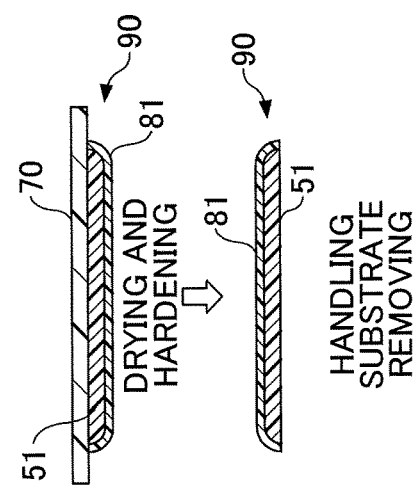
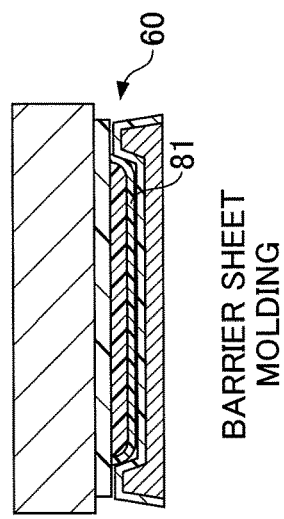
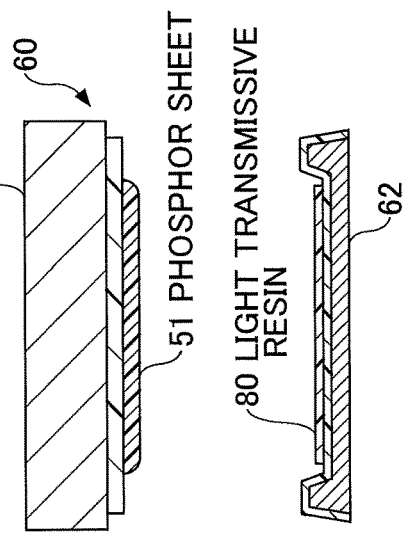

METHOD FOR MANUFACTURING A PHOSPHOR SHEET

CROSS-REFERENCE TO RELATED APPLICATION

The present application is based on and claims priority to Japanese Priority Application No. 2018-042870 filed on Mar. 9, 2018, the entire contents of which are hereby incorporated herein by reference.

BACKGROUND OF THE INVENTION

1. Field of the Invention

The present disclosure relates to a method for manufacturing a phosphor sheet.

2. Description of the Related Art

Conventionally, as described in Japanese Laid-Open Patent Application Publication No. 2017-174908, a method for manufacturing a light emitting device is known that is manufactured by rotating transparent resin containing a phosphor so as to spin down the phosphor in the transparent resin by a centrifugal force and to form the transparent resin into a double-layered structure of a transparent layer and a phosphor layer, heating and hardening the transparent resin in a state of the double-layered structure to form a phosphor sheet, superimposing the phosphor sheet on a light emitting element so that the phosphor layer contacts a light emitting face, and mounting the light emitting element on which the phosphor sheet is superimposed on a substrate that includes an interconnection layer.

The manufacturing method aims at reducing a variation of luminescence chromaticity caused by an angle while reducing a variation of phosphor concentration by uniformly distributing and spinning down the phosphor of each color by a centrifugal force.

However, in the method for manufacturing the phosphor sheet described in Japanese Laid-Open Patent Application Publication No. 2017-174908, the phosphor of each color does not necessarily distribute uniformly and the phosphor of each color sometimes thickens, thereby causing unevenness of emission of light in such a case.

SUMMARY OF THE INVENTION

The present disclosure provides a method for manufacturing a phosphor sheet that can reduce a variation of an emission spectrum and can obtain a uniform spectrum.

According to an embodiment, there is provided a method for manufacturing a phosphor sheet is provided. In the method, a particulate phosphor and a particulate transparent medium are mixed to a first light transmissive resin in a liquid state. The first light transmissive resin containing the phosphor and the transparent medium in the liquid state is supplied into a lower mold of a mold, and the mold is closed. The first light transmissive resin containing the phosphor and the transparent medium in the liquid state is changed to a solid state having a predetermined thickness by applying a heat and a pressure to the first light transmissive resin containing the phosphor and the transparent medium in the liquid state.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 2A to 2F are diagrams illustrating a series of processes of an example of a method for manufacturing a phosphor sheet according to an embodiment of the present disclosure;

DETAILED DESCRIPTION OF THE PREFERRED EMBODIMENTS

Embodiments of the present invention are described below with reference to accompanying drawings.

Figure 1A:
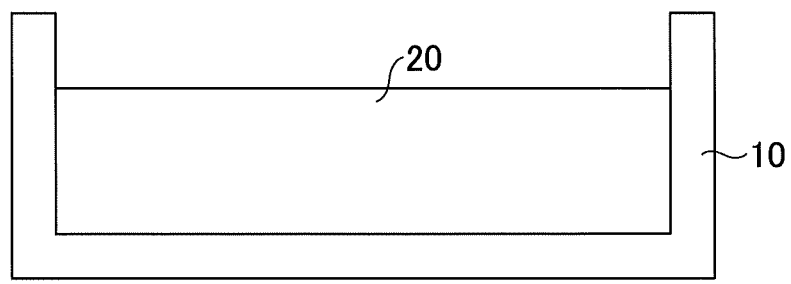
FIGS. 1A and 1B are diagrams illustrating an example of a mixing and kneading process of a method for manufacturing a phosphor sheet according to an embodiment of the present disclosure.
Figure 1B:
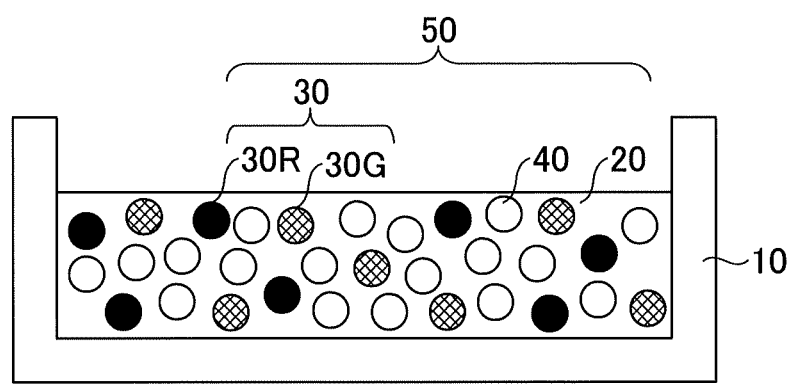

FIGS. 1A and 1B are diagrams illustrating an example of a mixing and kneading process of a method for manufacturing a phosphor sheet according to an embodiment of the present disclosure. The mixing and kneading process is a process to mix a phosphor and a transparent medium to light transmissive resin and to knead the light transmissive resin containing the phosphor and the transparent medium.

FIG. 1A is a diagram illustrating an example of a light transmissive resin preparation process. In the light transmissive resin preparation process, liquid light transmissive resin 20 that is used as a base agent is prepared. As illustrated in FIG. 1A, the liquid light transmissive resin 20 is prepared in a bath 10, for example.

A variety of resin that transmits light can be used as the light transmissive resin 20. For example, silicone resin, acrylic resin and the like are used. Appropriate light transmissive resin 20 can be selected depending on the intended use of a phosphor sheet to be manufactured.

FIG. 1B is a diagram illustrating an example of a mixing and kneading process. In the mixing and kneading process, a phosphor 30 and a transparent medium 40 are supplied into the light transmissive resin 20, and the light transmissive resin 20 containing the phosphor 30 and the transparent medium 40 are kneaded. Thus, kneaded light transmissive resin 50 in which the light transmissive resin 20 containing the phosphor 30 and the transparent medium 40 is kneaded is obtained. Although the light transmissive resin 20 is originally a liquid that has low viscosity, the viscosity increases by kneading the mixed light transmissive resin 20, and the kneaded light transmissive resin 50 becomes a semiliquid.

The phosphor 30 is a wave converting substance that converts a wavelength of incident original light and obtains light having a predetermined wavelength different from the original light. For example, the phosphor 30 includes a red phosphor 30R, and a green phosphor 30G. Literally, the red phosphor 30R is a phosphor that converts incident light to light having a red color wavelength and emits red light. Similarly, the green phosphor 30G is a phosphor that converts incident light to light having a green color wavelength and emits green light.

The phosphor 30 is formed as a fine particle. The phosphor 30 is, for example, formed as a fine particle having an average diameter of a slight or few μm to about 10 μm, preferably 1 μm to 10 μm, further preferably 2 μm to 10 μm.

The transparent medium 40 is a substance to allow original light, for example, blue color light from a blue LED (Light Emitting Diode) to selectively pass through and to prevent the phosphor 30 from clumping and concentrating. The transparent medium 40 is also formed as a fine particle. For example, organic beads (organic particles) having an average diameter of about 0.1 μm to about 30 μm are used for the transparent medium 40. A variety of materials can be used for the transparent medium 40 as long as the materials are transparent fine particles.

In the mixed and kneaded light transmissive resin 50 of the present embodiment, because the transparent medium 40 selectively lets the original light, for example, blue color light from a blue LED through, three colors of the converted red color light, the converted green color light and the original blue color light mix with each other while keeping an appropriate balance, and white color light can be obtained.

In addition, because the original light can be selectively allowed to pass by adding the transparent medium 40, by compression molding using a mold that will be described later, a gap between the fine particle of the phosphor 30 and the transparent medium 40 can be made zero so that the fine particle of the phosphor 30 and the transparent medium 40 closely contact with each other. Thus, light absorption excitation efficiency of the phosphor 30 can be improved.

FIGS. 2A to 3F are diagrams illustrating a series of processes of an example of a method for manufacturing a phosphor sheet according to an embodiment of the present disclosure. More specifically, FIGS. 2A to 2F are diagrams illustrating a series of processes to produce a phosphor sheet using the mixed and kneaded light transmissive resin 50 prepared in FIGS. 1A and 1B.

FIG. 2A is a diagram illustrating an example of a handling substrate loading process. In the handling substrate loading process, a handling substrate 70 is loaded on an upper mold 61 of a mold 60.

The method for manufacturing the phosphor sheet according to the present embodiment manufactures a phosphor sheet by a compression molding method using the mold 60. The mold 60 includes the upper mold 61 and a lower mold 62. Moreover, the handling substrate 70 is a film-shaped substrate and is finally removed.

In the handling substrate loading process, the mold 60 is opened, and the handling substrate 70 is loaded on the upper mold 61. Nothing is loaded on the lower mold 62 at this stage.

FIG. 2B is a diagram illustrating an example of a mixed and kneaded light transmissive resin supply process. In the mixed and kneaded light transmissive resin supply process, the mixed and kneaded light transmissive resin 50 is supplied into the lower mold 62 of the opened mold 60. Here, the mixed and kneaded light transmissive resin 50 is the mixed and kneaded light transmissive resin 50 prepared in the kneading process described with reference to FIGS. 1A and 1B.

FIG. 2C is a diagram illustrating an example of a phosphor sheet molding process. In the phosphor sheet molding process, the mold 60 is closed, and a predetermined pressure and predetermined heat are applied to the kneading light transmissive resin 50 for a predetermined period of time, thereby hardening (curing) the mixed and kneaded light transmissive resin 50. Thus, the phosphor sheet 51 is molded. Here, the pressure, an amount of heat, and a curing period of time (curing period) are properly set depending on the intended use.

FIG. 2D is a diagram illustrating an example of a light transmissive resin for a barrier sheet preparing process. In the light transmissive resin for the barrier sheet preparing process, light transmissive resin 80 for a barrier sheet is supplied into a lower mold 80. If a molded phosphor sheet 51 is taken out at this state, the phosphor sheet 51 may be removed from the upper mold 61. Because the phosphor sheet 51 hardly has elasticity, and because the phosphor sheet 51 is in a crisp but fragile state, and is likely to get broken and to be damaged when an excessive force is applied, the phosphor sheet 51 needs to be carefully handled.

In contrast, when a barrier sheet is formed on a surface of the phosphor sheet 51, the light transmissive resin for the barrier sheet 80 is supplied into the lower mold 62 while the upper mold 61 holds the phosphor sheet 51. Here, in order to readily distinguish elements from each other, the light transmissive resin 20 used for the mixed and kneaded light transmissive resin 50 may be referred to as first light transmissive resin 20, and the light transmissive resin 80 for the barrier sheet 80 may be referred to as second light transmissive resin 80, hereinafeter.

The second light transmissive resin 80 may be the same resin as the first light transmissive resin 20, or may be different resin. However, even when different types of resin are used from each other, a resin system is preferably the same as each other to stabilize optical characteristics. For example, when silicone resin is used as the first light transmissive resin 20, silicon resin is preferably selected as the second light transmissive resin 50. Moreover, when acryl resin is used as the first light transmissive resin 20, acryl resin is preferably selected as the second light transmissive resin 50. Here, because the silicone resin and the acryl resin include a variety of chemical compounds, resin made of different chemical compounds and resin of different products among the same resin system can be used depending on the intended use without any problem. However, using the first light transmissive resin 20 and the second light transmissive resin 80 in the same resin system is not essential, but using different systems of the light transmissive resin 20 and 80 is possible.

Furthermore, a variety of resins can be used as the second light transmissive resin 80 depending on the intended user as long as resin is appropriate for a barrier sheet. For example, silicone resin or acryl resin may be used as the second light transmissive resin 80.

Here, the barrier sheet is provided on a surface of the phosphor sheet 51, and is a protective film to prevent water and dust from entering the phosphor sheet 51. Resin in which oxygen transmittance is controlled is used. Hence, such resin whose oxygen transmittance is controlled is preferably selected as the second light transmissive resin 80.

FIG. 2E is a diagram illustrating an example of a barrier sheet molding process. In the barrier sheet molding process, the mold 60 is closed, and a predetermined pressure and a predetermined heat are applied to the phosphor sheet 51 and the second light transmissive resin 80 for a predetermined period of time, thereby hardening (curing) the second light transmissive resin 80. Thus, the barrier sheet 81 is molded in a state of integrated with the phosphor sheet 51. Here, the pressure, the amount of heat, and the hardening period of time (curing period) can be properly set depending on the intended use.

FIG. 2F is a diagram illustrating an example of a phosphor sheet having a barrier layer removing process. In the phosphor sheet having the barrier layer removing process, a phosphor sheet having a barrier layer 90 molded by integrating the barrier sheet 81 and the phosphor sheet 51 together, is removed from the upper mold 61 together with the barrier sheet 81. Because the barrier sheet 81 and the phosphor sheet 51 are integrated with each other, there is no boarder between the barrier sheet 81 and the phosphor sheet 51, and the phosphor sheet having the barrier layer 90 is formed in a state of the barrier sheet 81 and the phosphor sheet 51 present continuously. In this regard, the phosphor sheet having the barrier layer 90 differs from a structure of joining a single barrier sheet to a phosphor sheet. This is because a bonding layer is formed between the barrier sheet and the phosphor sheet.

Subsequently, the phosphor sheet having the barrier layer 90 is dried for a predetermined period of time and is hardened, and the handling substrate 70 is removed. Thus, the phosphor sheet having the barrier layer 90 can be obtained. Here, the drying period of time for the phosphor sheet having the barrier layer 90 can be set at a variety of periods of time depending on the intended use as long as the phosphor sheet having the barrier layer 90 can be dried and hardened.

The obtained phosphor sheet having the barrier layer 90 has elastic and flexible properties, or extendable and stretchable properties, and becomes a very durable sheet unlikely to be damaged.

Although the method for manufacturing the phosphor sheet 51 and the phosphor sheet having the barrier layer 90 is described hereinabove, the method for manufacturing the phosphor sheet 51 and the phosphor sheet having the barrier layer 90 according to the present embodiment has a significantly different point from a conventional method for manufacturing a phosphor sheet.

To begin with, in a conventional method for manufacturing a phosphor sheet, a phosphor sheet is manufactured by mixing only a phosphor into liquid light transmissive resin, applying the liquid to a base plate, and drying and hardening the applied liquid into a sheet shape. Here, as a method of applying the liquid light transmissive resin to which the phosphor is mixed to the base plate, a method using a film coating device such as a coater and a spinner, and a printing method such as a screen method and a flat plate printing method and the like are used. Furthermore, a method of dispensing liquid resin in which phosphors distribute and using the application film as a sheet is also used.

However, as described above with reference to FIG. 1, because a state of adding fine particles of a phosphor into liquid light transmissive resin is equivalent to a state of mixing a foreign substance of the phosphor into the liquid light transmissive resin, a flow condition differs from each other depending on a difference of specific gravity, a volume and the like of a phosphor of each color. Thus, controlling a film thickness by a coater and the like or a spinner and the like is difficult. Moreover, because the printing method controls a film thickness by a mechanical scratch to filling, uniformity is limited to a certain level, and destruction and change of quality of the phosphor material that is a fragile material caused by a regional load are concerned. In addition, the dispensing method depends on viscosity and fluidity of resin, and besides, has difficulty solving instability of an application shape caused by a surface tension.

Furthermore, although the application method and the printing method have optimal conditions, each of the conditions is in a very narrow range, and needs a condition setting such as a content percentage of the phosphor. For example, if a variation in film thickness across a surface by the application method is 30%, and a variation in film thickness by the printing method is from ±5 to ±3%, and when a film thickness model is 200 µm, the film thickness becomes 140 to 260 µm in the application method, and becomes 190 to 210 µm in the printing method, which becomes a factor of causing a variation in emission spectrum (chromaticity, luminescence, and color temperature).

In contrast, the method for manufacturing the phosphor sheet according to the present embodiment can readily control the film thickness by the mold 60 using the compression molding. For example, a variation across a surface (film thickness variation) can be reduced to ±2 µm or lower for a desired plate thickness, and a variation in emission spectrum caused by the variation in film thickness can be significantly reduced, thereby obtaining desired optical characteristics.

Furthermore, although a protective film is frequently provided on a surface of a phosphor sheet, a known release agent such as PET (polyethylene terephthalate) and PI (polyimide resin) is applied to the surface of the phosphor sheet as a conventional protective film, and is taken out and removed when the phosphor sheet is connected to an LED.

Moreover, although a sealing material made of light transmissive resin and the like are installed on the phosphor sheet to prevent a phosphor from deteriorating, the sealing material is treated in another process as another part in many cases.

Thus, the conventional method for manufacturing the phosphor sheet adopts a method of preparing the protective film and the sealing material as other parts, and bonding the protective film and the sealing material to the phosphor sheet.

However, in the method for manufacturing the phosphor sheet according to the present embodiment, as described with reference to FIGS. 2D to 2F, the phosphor sheet 51 and the barrier sheet 81 can be continuously molded. Thus, the phosphor sheet having the barrier layer 90 can be manufactured in a complete integrated and continuous manner without leaving a border between the phosphor sheet 51 and the barrier sheet 81, thereby manufacturing the high-quality phosphor sheet having the barrier layer 90 that excels in stability and optical properties. In other words, because generation of light transmissive attenuation (unnecessary reflection, unnecessary refraction and the like) that prevents light from emitting can be inhibited by making a uniform boundary surface, and optical properties stabilize. In addition, by using the manufactured phosphor sheet having the barrier layer 90 or the phosphor sheet 51 in an LED light emitting device, a light source device and the like, a stable LED device, a stable light source device and the like without unevenness of brightness and color unevenness can be achieved.

FIGS. 3A to 3E are diagrams illustrating examples of a variety of forms that can be manufactured by the method for manufacturing the phosphor sheet according to the present embodiment.

Figure 3A:
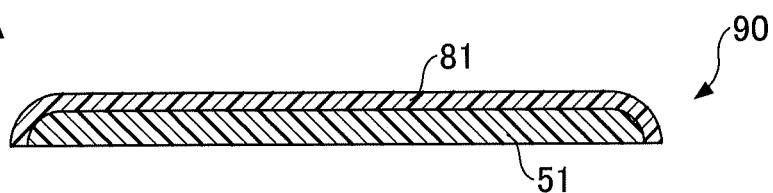
FIGS. 3A to 3E are diagrams illustrating examples of a variety of forms of phosphor sheets with barrier layers that can be manufactured by a method for manufacturing a phosphor sheet according to an embodiment of the present disclosure.

FIG. 3A is a diagram illustrating a cross-sectional structure of a phosphor sheet having a barrier layer 90 according to a first embodiment described with reference to FIGS. 2A to 2F. FIG. 3A illustrates a configuration in which an upper surface of a phosphor sheet 51 is covered with a barrier sheet 81. For example, the phosphor sheet having the barrier layer 90 may be configured to have the phosphor sheet 51 whose upper surface is covered with the barrier sheet 81 in this manner.

Figure 3B:
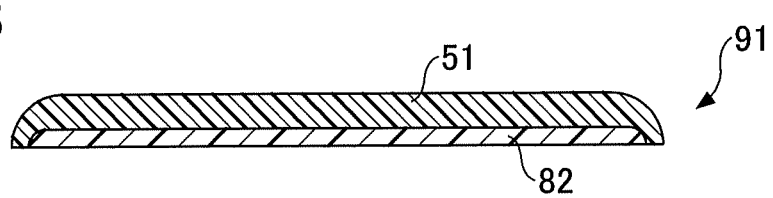

FIG. 3B is a cross-sectional view illustrating an example of a phosphor sheet having a barrier layer 91 according to a second embodiment. The phosphor sheet having the barrier layer 91 according to the second embodiment illustrated in FIG. 3B is configured to have a barrier sheet 82 provided on a lower surface of a phosphor sheet 51. The phosphor sheet having the barrier layer 91 may be configured to have the lower surface covered with the barrier sheet 82.

Figure 3C:
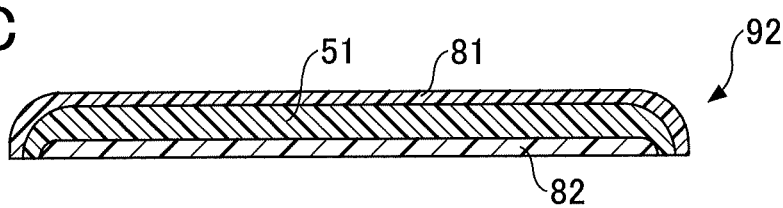

FIG. 3C is a cross-sectional view illustrating an example of a phosphor sheet having a barrier layer 92 according to a third embodiment. The phosphor sheet 92 according to the third embodiment illustrated in FIG. 3C is configured to have a phosphor sheet 51 whose upper surface is covered with a barrier sheet 81 and whose lower surface is covered with a barrier sheet 82. Thus, both surfaces of the phosphor sheet 51 may be covered with the barrier sheets 81 and 82. An intrusion of water, dust and the like from both sides of the upper surface and the lower surface can be prevented, and degradation of the phosphor sheet 51 can be reliably prevented.

Figure 3D:
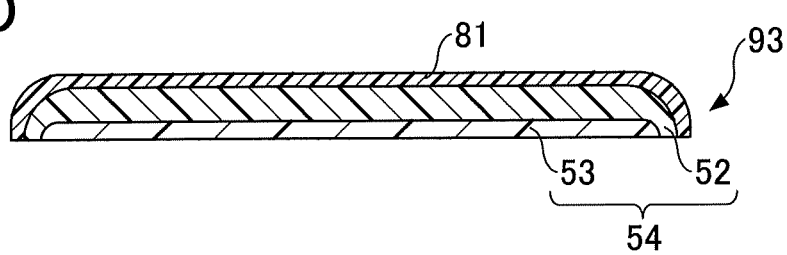

FIG. 3D is a diagram illustrating a cross section of a phosphor sheet having a barrier layer 93 according to a fourth embodiment. FIG. 3D illustrates a configuration including a phosphor sheet 54 and a barrier sheet 81. The phosphor sheet 54 is configured by stacking two phosphor sheets 52 and 53 that have different types of phosphors, compounding ratios and the like. The barrier sheet 81 covers an upper surface of the phosphor sheet 54 (an upper sheet of the phosphor sheet 52 in more detail). Thus, for example, the phosphor sheet 54 may be configured by stacking two types of phosphor sheets, and the barrier sheet 81 may be provided on the upper surface of the phosphor sheet 54.

Figure 3E:
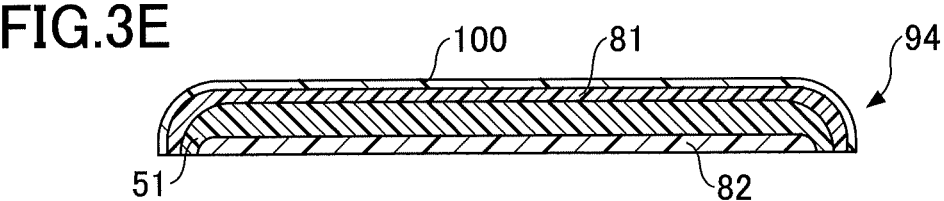

FIG. 3E is a cross-sectional view illustrating an example of a phosphor sheet having a barrier sheet 94 according to a fifth embodiment. The phosphor sheet having the barrier layer 94 according to the fifth embodiment illustrated in FIG. 3E is configured to include a phosphor sheet 51, a barrier sheet 81 provided on an upper surface of the phosphor sheet 51, and a barrier layer 82 provided on a lower surface of the phosphor sheet 51 similar to the phosphor sheet having the barrier layer 92 according to the third embodiment, and to further include a protective film 100 on the barrier sheet 81 provided on the upper surface of the phosphor sheet 51. Here, the protective film 100 may be formed by compression molding simultaneously with the barrier sheet 81. Thus, by covering both sides of the phosphor sheet 51 having the barrier sheets 81 and 82 and further providing the protective film 100 on the upper surface of the barrier sheet 81, the intrusion of water, dust and the like can be more reliably prevented, and the degradation of the phosphor sheet 51 can be reliably prevented.

WORKING EXAMPLE

Figure 4A:
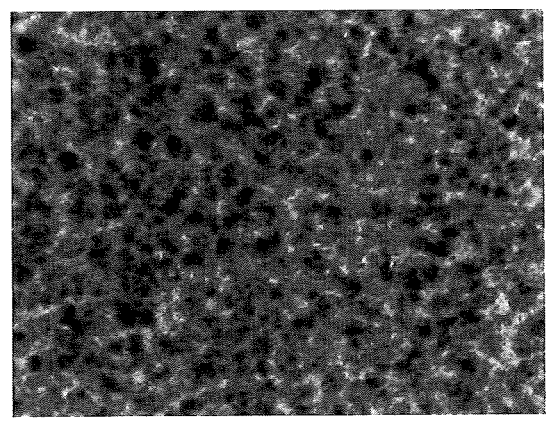
FIGS. 4A and 4B are pictures showing a result of a working example of performing a method for manufacturing a phosphor sheet according to an embodiment of the present disclosure with a result of a comparative example.
Figure 4B:
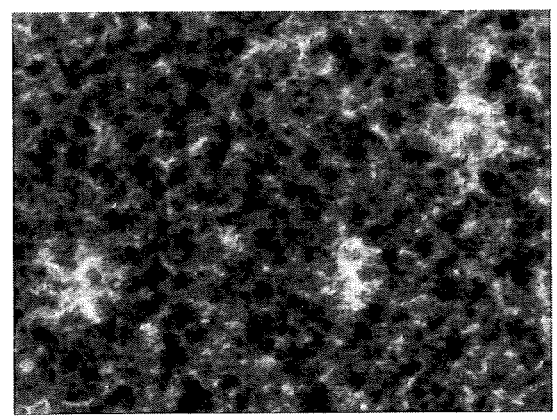

FIGS. 4A and 4B are views showing a result of a working example of performing the method for manufacturing the phosphor sheet according to the embodiments of the present disclosure with a result of a comparative example.

FIG. 4A is an enlarged picture showing a result of a working example of performing the method for manufacturing the phosphor sheet according to the present embodiment.

In more detail, FIG. 4A is an enlarged picture of a phosphor sheet having a barrier sheet including the barrier sheet formed on the phosphor sheet. FIG. 4A includes white locations, from which light leaks, that is, locations where there is no phosphor, but does not include a large white portions, and indicates that the phosphors are uniformly distributed as a whole.

FIG. 4B is an enlarged picture of a phosphor sheet having a barrier layer manufactured by a method for manufacturing a phosphor sheet according to a comparative example. In the method for manufacturing the phosphor sheet according to the comparative example, a phosphor sheet was produced by a printing method, and then a phosphor sheet having a barrier layer was produced by bonding a barrier sheet of another part to the phosphor sheet.

As shown by FIG. 4B, white portions are found at multiple locations, which means that locations that leak much light are present in the phosphor sheet. Thus, according to the printing method, the phosphors are unevenly distributed, and an emission spectrum has a variation.

In contrast, as shown by FIG. 4A, in the phosphor sheet having the barrier layer of the working example, the phosphors are uniformly distributed, and the phosphor sheet having the barrier layer having a uniform emission spectrum can be manufactured.

Here, because the barrier sheet is only a transparent sheet, a phosphor sheet without a barrier layer can naturally achieve a uniform emission spectrum.

Thus, according to the method for manufacturing the phosphor sheet according to the present embodiment can manufacture a highly efficient phosphor sheet having a uniform emission spectrum by preparing a mixed and kneaded light transmissive resin by mixing not only a phosphor but also a transparent substance into liquid light transmissive resin, and performing compression molding. Moreover, subsequently, by forming a barrier sheet integrally by compression molding, a highly durable phosphor sheet having a barrier layer with elasticity, extensibility, and flexibility can be manufactured.

As discussed above, the embodiments of the present disclosure can reduce a variation of an emission spectrum.

All examples recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A method for manufacturing a phosphor sheet, the method comprising steps of:
   mixing a particulate phosphor and a particulate transparent medium to a first light transmissive resin in a liquid state;
   kneading the first light transmissive resin containing the phosphor and the transparent medium while keeping a mixed state of the particulate phosphor material and the first light transmissive resin, thereby forming a kneaded first light transmitted resin containing the phosphor and the transparent medium in a semi-liquid state, the transparent medium preventing the phosphor from clumping and concentrating;

supplying the kneaded first light transmissive resin containing the phosphor and the transparent medium in the semi-liquid state into a lower mold of a mold;

closing the mold; and changing the kneaded first light transmissive resin containing the phosphor and the transparent medium in the semi-liquid state to a solid state having a predetermined thickness while keeping the mixed state of the particulate phosphor material and the transparent medium by applying a heat and a pressure to the kneaded first light transmissive resin containing the phosphor and the transparent medium.

2. The method according to claim 1, further comprising:

opening the mold;

taking the solid first light transmissive resin containing the phosphor and the transparent medium out of the mold; and drying and hardening the solid first light transmissive resin containing the phosphor and the transparent medium.

3. The method according to claim 1, wherein the step of mixing the particulate phosphor and the particulate transparent medium to the first light transmissive resin comprises a step of mixing the particulate phosphor and an organic fine particle to the first light transmissive resin.

4. The method according to claim 1, wherein the step of mixing the particulate phosphor and the particulate transparent medium to the first light transmissive resin comprises a step of mixing a particulate phosphor having an average diameter in a range of 1 to 10 µm and a particulate transparent medium having an average diameter in a range of 0.1 to 30 µm.

5. A method for manufacturing a phosphor sheet, the method comprising steps of:

mixing a particulate phosphor and a particulate transparent medium to a first light transmissive resin in a liquid state;

kneading the first light transmissive resin containing the phosphor and the transparent medium while keeping a mixed state of the particulate phosphor material and the first light transmissive resin, thereby forming a kneaded first light transmissive resin containing the phosphor and the transparent medium in a semi-liquid state, the transparent medium preventing the phosphor from clumping and concentrating;

supplying the kneaded first light transmissive resin containing the phosphor and the transparent medium in the semi-liquid state into a lower mold of a mold;

closing the mold; and changing the kneaded first light transmissive resin containing the phosphor and the transparent medium in the semi-liquid state to a solid state having a predetermined thickness while keeping the mixed state of the particulate phosphor material and the transparent medium by applying a heat and a pressure to the kneaded first light transmissive resin containing the phosphor and the transparent medium;

opening the mold including a solid first light transmissive resin in the lower mold;

supplying a second light transmissive resin in a liquid state into the lower mold including the solid first light transmissive resin;

closing the mold including the second light transmissive resin and the solid first transmissive resin;

applying heat and pressure to the solid first light transmissive resin and the second light transmissive resin in the liquid state in the mold, thereby changing the second transmissive resin in the liquid state to a solid state having a predetermined thickness, and integrating the solid first light transmissive resin and a solid second light transmissive resin together;

opening the mold;

taking the integrated first light transmissive resin and second light transmissive resin;

drying and hardening the integrated first light transmissive resin and second light transmissive resin.

6. The method according to claim 5, wherein the step of mixing the particulate phosphor and the particulate transparent medium to the first light transmissive resin comprises a step of mixing the particulate phosphor and an organic fine particle to the first light transmissive resin.

7. The method according to claim 5, wherein the step of mixing the particulate phosphor and the particulate transparent medium to the first light transmissive resin comprises a step of mixing a particulate phosphor having an average diameter in a range of 1 to 10 µm and a particulate transparent medium having an average diameter in a range of 0.1 to 30 µm.

8. The method according to claim 5, wherein the first light transmissive resin and the second light transmissive resin are in a same resin system.

9. The method according to claim 5, wherein the first light transmissive resin and the second transmissive resin are in a silicon resin system or an acryl resin system.

* * * * *